(12) United States Patent
Carlioz et al.

(10) Patent No.: US 11,046,436 B2
(45) Date of Patent: Jun. 29, 2021

(54) AIRCRAFT SEATING ASSEMBLIES

(71) Applicant: ACLA Studio LLC, El Segundo, CA (US)

(72) Inventors: Victor Carlioz, Manhattan Beach, CA (US); Matthew Cleary, Manhattan Beach, CA (US)

(73) Assignee: ACLA STUDIO LLC, El Segundo, CA (US)

( * ) Notice: Subject to any disclaimer, the term of this patent is extended or adjusted under 35 U.S.C. 154(b) by 147 days.

(21) Appl. No.: 16/143,293

(22) Filed: Sep. 26, 2018

(65) Prior Publication Data
US 2019/0092475 A1    Mar. 28, 2019

Related U.S. Application Data

(60) Provisional application No. 62/563,572, filed on Sep. 26, 2017.

(51) Int. Cl.
*B64D 11/06*    (2006.01)

(52) U.S. Cl.
CPC ...... *B64D 11/0601* (2014.12); *B64D 11/0606* (2014.12); *B64D 11/0641* (2014.12); *B64D 11/0643* (2014.12)

(58) Field of Classification Search
CPC ............ B64D 11/0601; B64D 11/0606; B64D 11/0641; B64D 11/0643; B64D 11/0646; B60N 2/42

USPC ................................................... 297/243, 61
See application file for complete search history.

(56) References Cited

U.S. PATENT DOCUMENTS

| | | | | |
|---|---|---|---|---|
| 8,690,254 | B2 * | 4/2014 | Cailleteau | B64D 11/06 297/411.36 |
| 9,409,648 | B2 * | 8/2016 | Eakins | B60N 2/34 |
| 2012/0298798 | A1 * | 11/2012 | Henshaw | B60N 2/34 244/118.6 |
| 2015/0225086 | A1 * | 8/2015 | Darbyshire | B64D 11/06 244/118.6 |
| 2016/0083093 | A1 * | 3/2016 | Tighe | B64D 11/0606 244/118.6 |

* cited by examiner

*Primary Examiner* — Milton Nelson, Jr.
(74) *Attorney, Agent, or Firm* — Dergosits & Noah LLP (57) ABSTRACT

A seating assembly may employ one or more of: a seat stagger, a seat overlap, and a seat angling to offer significant width and comfort gains and reduce the negative impact of width and leg room gains on seating density. With one seat of a pair staggered forward with respect to the other seat each may then be moved laterally and overlap (as seen from the front). The seating positions may be further improved by angling each seat away from their center arm rest area, reducing the encroaching effect of the overlap by pointing the passenger away from the overlap, reducing the visual impact of the staggered seating by pointing the passenger away from the nearest seat ahead, and improving leg room by directing the passenger's legs forward at an angle.

13 Claims, 13 Drawing Sheets

AIRCRAFT SEATING ASSEMBLIES

CROSS-REFERENCE TO RELATED CASES

The present application claims priority to U.S. Provisional Patent Application 62/563,572, entitled "AIRCRAFT SEATING ASSEMBLIES," filed on Sep. 26, 2017, which is hereby incorporated by reference.

TECHNICAL FIELD

The present invention relates to the field of seating, including, more particularly, to seating assemblies for vehicles that transport passengers, such as, e.g., aircraft.

BACKGROUND

Aircraft seating space is naturally limited. Typically, there is a compromise between passenger space and aircraft seating density. The compromise is between the seating density that provides the desired revenue per flight and the space per passenger that provides for a comfortable flight. As aspect of this compromise is that the premium economy-seat market is a growing market. It is situated between business class and economy class in terms of comfort and density. The existing seating arrangements for premium economy are usually very simple—including simply a bigger and wider version of an economy class seat, which impacts seat density proportionally. Similarly, for business classes that offer bed options, the typical arrangement negatively impacts seat density.

Thus, there exists a need for seating assemblies that offer significant width and comfort gains and reduce the negative impact on seating density.

BRIEF DESCRIPTION OF THE DRAWINGS

Objects, features, and advantages of the embodiments will become apparent upon consideration of the following detailed description and the accompanying drawings. The embodiments are illustrated by way of example and not limitation in the figures of the accompanying drawings, in which like references indicate similar elements, and in which.

DETAILED DESCRIPTION

A Premium Economy Seat Assembly

Embodiments of a seating assembly offer significant width and comfort gains, or reduce the negative impact of width and leg room gains on seating density, or both, by employing one or more of: a seat stagger, a seat overlap, and a seat angling. With a seat stagger, one of a seat pair is moved forward with respect to the other seat. For example, the window seat may be moved forward with respect to the aisle seat. This allows each seat to then be moved laterally, toward the other, so that they overlap somewhat (as seen from the front). The stagger and overlap allow each seat to have a dedicated armrest, and have increased and dedicated shoulder space. The relative comfort of each seat of the seat pair may be further improved by angling each seat away from their center arm rest area. This angling reduces the encroaching effect of the overlap by pointing the passenger away from the overlap. This angling reduces the visual impact of the staggered seating by pointing the passenger away from the nearest seat ahead. The angling also improves legroom by directing the passenger's legs forward at an angle, which benefits form the additional distance of a hypotenuse when compared to the straight-ahead distance between seats.

In an embodiment, a seating assembly includes a pair of seats. The first seat includes a shell with a privacy panel extending toward the second seat. The first seat also includes, supported by the shell, a headrest, a backrest, a seat pan with a seat pan edge, and an armrest. The second seat includes a shell with a panel extending toward the first seat. The second seat also includes, supported by the shell, a headrest, a backrest, a seat pan with a seat pan edge, and an armrest. In this embodiment, the armrests are oriented fore/aft, defining a front direction, and the first seat's shell is positioned forward in the first direction from the second seat's shell. Also, the first seat's shell is moved sideways, toward the second seat, such that at least part of the first seat's armrest is positioned directly in front of the second seat's armrest. In the embodiment, with part of the first armrest being directly in front of the second armrest and the first panel extending toward the second seat and around the first seat's armrest, the first seat's armrest is now dedicated to the first seat. Also, depending on the height of the first privacy panel, there is no line of sight between passengers in the first and second seats.

Additional embodiments may add one or more of the following features to the embodiment above: the first seat's privacy panel may extend from behind the first backrest and along an edge of the first armrest; the first seat's privacy panel may extend from the first armrest up to the top of the first seat's shell; the first privacy panel, in extending from the armrest up to the top of the shell, may also extend further sideways creating more shoulder space beyond the first seat's armrest.

In another embodiment, a seating assembly includes a pair of seats. The first seat includes a first shell with a first panel extending toward the second seat. The first seat further includes, supported by the first shell, a first headrest, a first backrest, a first seat pan with a first seat pan edge, and first and second armrests. The second seat includes a second shell with a second panel extending toward the first seat. The second seat further includes, supported by the second shell, a second headrest, a second backrest, a second seat pan with a second seat pan edge, and third and fourth armrests. In this embodiment, the second and third armrests are inner armrests with respect to the first and second seat pans, the first and fourth armrests are outer armrests, and the armrests are oriented in fore/aft direction, with the first shell being positioned forward a first distance from the second shell. The second seat pan edge and the second backrest are at a first angle past perpendicular from the fore/aft direction. And a first tangent to the second shell creates a second angle past perpendicular from the fore/aft direction, the second angle, measured at a first height between a seat pan height and a shoulder height, increases as the second shell extends toward the first backrest. In this embodiment, when a second pair of seats (including a third and fourth seat that are identical to the first pair) is positioned a distance immediately behind the first pair of seats, the first angle, the second angle, and the distance cooperate to provide an access path between the second and fourth seats to the third seat, where the access path has a minimum spacing between the second shell and the third seat pan. In this embodiment, both first and second seats' armrests are dedicated to the respective seat and both first and second seats, depending on the height of privacy panel, have a privacy panel blocking their line of sight.

Additional embodiments may add one or more of the following features to the embodiment immediately above: the second shell behind the second backrest may be curved such that a second tangent to the second shell creates a third angle, measured from vertical, the third angle increasing as the second shell curves from a backrest top to a backrest bottom; the first shell may be positioned from the second shell and in front of the second seat such that at least part of the first armrest is positioned directly in front of the second armrest; the first panel may extend from behind the first backrest and along an edge of the first armrest, and the second panel may extend from behind the second backrest and along an edge of the second armrest to the first shell; the first panel may extend from the first armrest up to the top of the first headrest and the second panel may extend from the second armrest up to the top of the first headrest; and the first panel, in extending from the armrest up to the top of the first headrest, may also extend further in front of the second seat, creating a first shoulder space beyond the first armrest, and the second panel, in extending from the second armrest up to the top of the first headrest, may also extends further behind the first seat, creating a second shoulder space beyond the second armrest.

In addition, features of the two embodiments above may be combined to create further embodiments.

Figure 1:
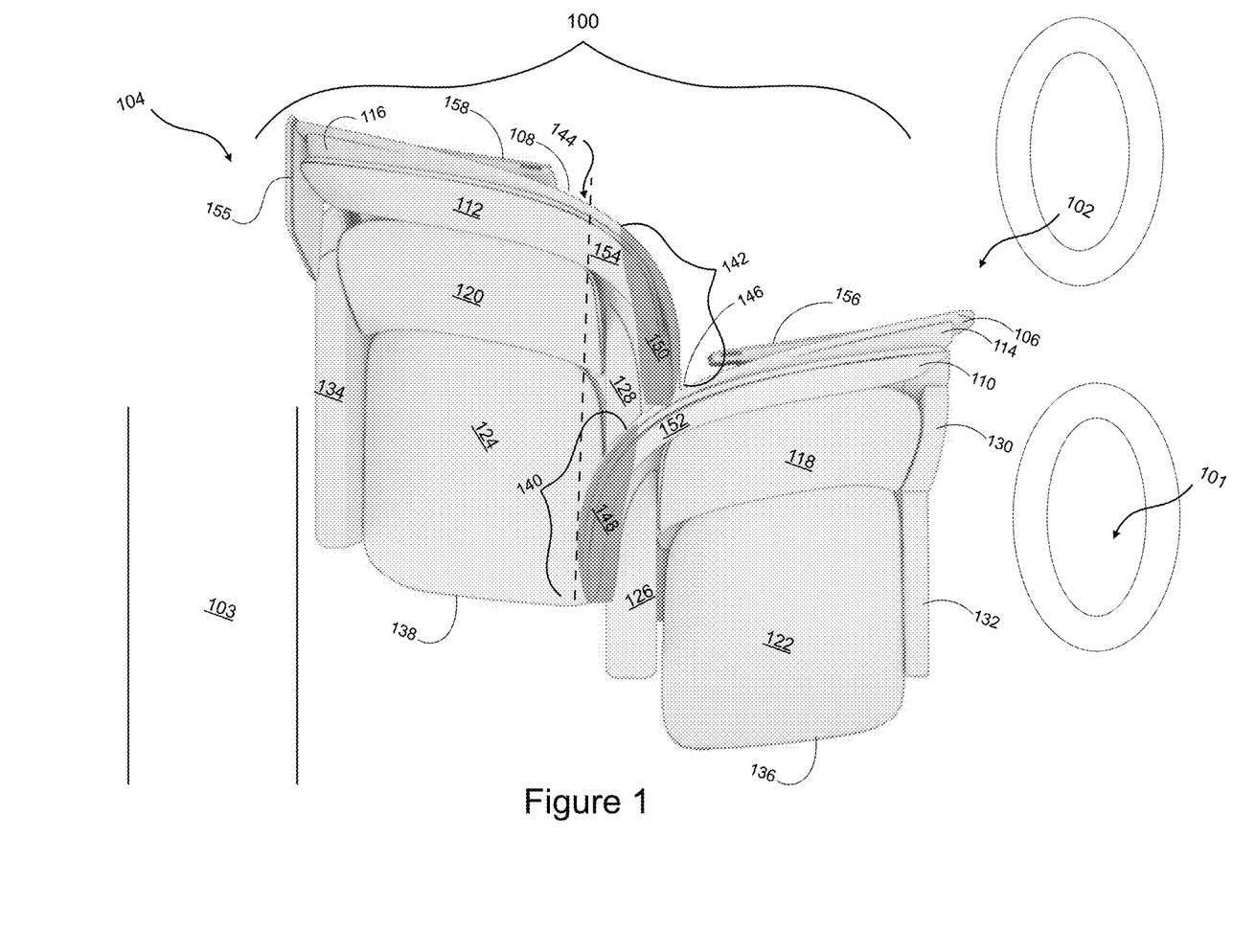
FIG. 1 is a top perspective view of an embodiment of a seating assembly.

FIG. 1 is a top perspective view of an embodiment of a staggered seating assembly 100. In FIG. 1, seats 102 and 104 are staggered, with seat 104 being placed slightly behind seat 102 with respect to both the longitudinal axis of the compartment and the transverse axis. Staggering seats 102 and 104 allows for the allocation of a dedicated armrest for each passenger and the addition of dividing panels that enhance each passenger's privacy. In addition, with seat 104 being slightly behind seat 102, both seat's widths may be increased, resulting in an overlap of the dedicated armrests as viewed from the front, with the overlap also providing increased shoulder space for each passenger.

In FIG. 1, staggered seat pair 100 includes seats 102 and 104, with seat 104 being staggered aft of seat 102. The embodiment depicts seat pair 100 between a window 101 and an aisle 103, but the benefits of the staggered pair may be received by staggering seats elsewhere in the passenger compartment. Seats 102, 104 are supported by fixed furniture 106, 108, respectively. Seats 102, 104 each include a headrest 110, 112, a headrest wedge/guide 114, 116, a backrest (or "seat back") 118, 120, a seat pan 122, 124, a central armrest 126, 128, and a seat pan front edge 136, 138. Forward seat 122, being positioned next to window 101, may further include a window-side armrest 130, shown "stowed" or "retracted," which allows the passenger to recline comfortably against the retracted armrest 130 in the corner against the bulkhead with extra seat pan area 132. In contrast, aisle-side armrest 134 is typically fixed, though in embodiments it may be retracted similarly to armrest 130. In embodiments, monitors 156, 158 may be attached to the back of fixed furniture 106, 108. Due to the angle and curvature of the fixed furniture 106, 108, monitors 156, 158 may be attached at one end, e.g., attachment ends 160, 162. The angles of seat pan edges 136, 138, backrest 118, 120, and fixed furniture 106, 108 will be discussed further with references to, e.g., FIG. 3.

Continuing with FIG. 1, forward fixed furniture 106 includes a privacy furniture sections 140, 152 that wrap around the perimeter of armrest 126, creating a dedicated shoulder space. Furniture section 140 creates an increased shoulder space 148 by extending toward aisle 103 as section 140 rises above armrest 126. Similarly, aft fixed furniture 108 includes a privacy furniture sections 142, 154 that wrap around the perimeter of armrest 128, creating a dedicated shoulder space. Furniture section 142 creates an increased shoulder space 150 by extending toward window 101 as section 142 rises above armrest 128. The extent of the overlap can be seen by comparing where aft fixed furniture 108 intersects forward fixed furniture 106 at endpoint 146 to where the projection of forward fixed furniture 106 intersects aft fixed furniture 108 at endpoint 144. The space within that overlap (the space above armrest 128 with shoulder space 150) is dedicated completely to seat 104. Forward seat 102 benefits with a similar dedicated space. Furthermore, privacy sections 140, 142, 152, 154 isolate seats 102, 104 visually as well. In an embodiment, seat 104 may be provided with an aisle-side screen 155 to enhance privacy and provide an optional resting position for the passenger's head.

It is an aspect of the embodiment that headrests, backrests, seat pans, and leg rests move with respect to the fixed furniture, and that the fixed furniture does not move with respect to the compartment or the seat behind it. Thus, the distance between one seat and the seat immediately in front is determined by the distance between the fixed furniture (fixed) and seat pan (movable) or leg rest (movable). With a passenger's seat pan and leg rest being under the control of the passenger, and with the furniture in front being fixed, each passenger may define their personal space without the unwelcome potential for the seat in front to being reclined and intrude into their space.

Figure 2:
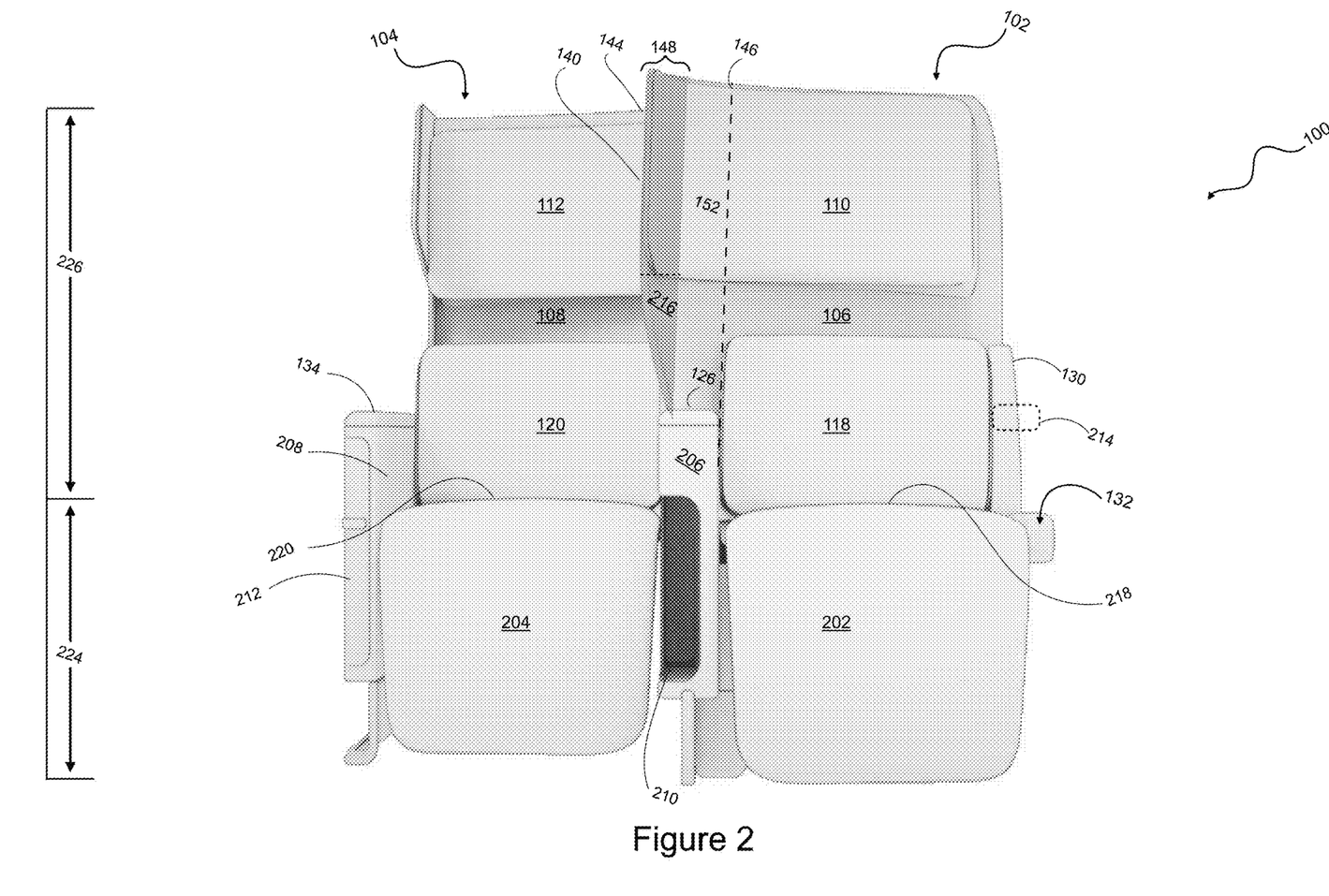
FIG. 2 is a front view of the embodiment of FIG. 1.

FIG. 2 is a front view of the embodiment of seat pair 100 of FIG. 1. The front view of FIG. 2 further illustrates how privacy furniture section 152 combines with section 140 in providing dedicated space above armrest 126, between overlap point 146 and the end of section 140. The front view of FIG. 2 also illustrates how privacy furniture section 140 may extend toward aisle 103 as it rises above armrest 126, initially creating an outward ramp space 126 that eventually develops into forward should space 148. A similar outward ramp space for aft seat 104 and aft shoulder space 150 are discussed further with respect to FIG. 5.

In FIG. 2, seats 102, 104 are shown to further include a leg rest 202, 204. Seat pair 100 includes a center console 206 with a center console storage 210, and an aisle console 208 with an aisle console storage 212. Armrest 130 is illustrated in the working "extended" position 214. Pan extra area 132 is shown to correspond in height to a forward pan surface 218 and an aft pan surface 200, all at a height 224 above the floor. Seats 102, 104 are shown to extend a further height 226 above height 224. In an embodiment, height 224 is approximately eighteen inches and height 226 is approximately forty-five or preferably forty-eight inches. As aspect of the height of fixed furniture 106, 108 is that they provide visual as well as physical privacy. Thus, while privacy section 142 may not be needed to protect armrest 128 from a passenger in seat 102, privacy section 142 does visually isolate seat 104 from a seat that is behind seat 102. Console storage 210, as shown is positioned for use by the passenger of seat 104.

In an embodiment, privacy furniture sections 140 and 142 may extend around armrests 126, 128 and up from armrests 126, 128 to an extend that results in each armrest being dedicated to the respective seat, but that does not visually isolate seat 102 from seat 104. For example, privacy section 140 may extend six or even fewer inches above armrest 126 and still effectively dedicate armrest 126 to set 102.

In an embodiment, each seat may include additional features, for example: a reading light may be attached to the privacy furniture section.

Figure 3:
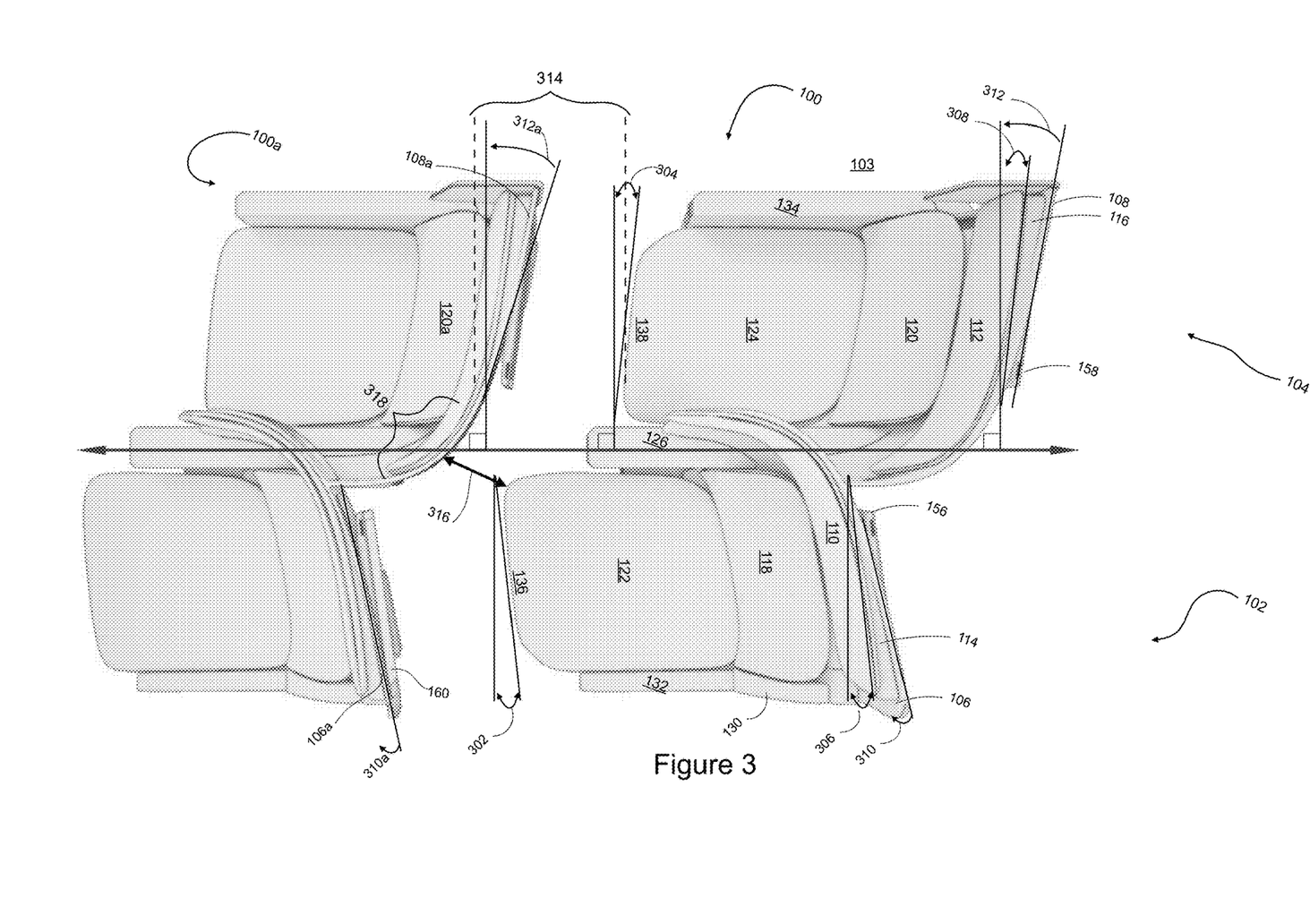
FIG. 3 is a top perspective view of the embodiment of FIG. 1.

FIG. 3 is a top perspective view of the embodiment of seat pair 100 of FIG. 1. In FIG. 3, a second seat pair 100a, identical in all respects to pair 100, is positioned in front of seat pair 100. Forward seat 102 is staggered an amount 314 in front of aft seat 104. Generally, FIG. 3 illustrates the contributions of certain angles and curvatures to: the different seating angles of seats 102 and 104; a minimum spacing 316 between seat 102 and a fixed furniture curved section 318 of an aft fixed furniture 108a; and to an ingress/egress path (406, FIG. 4) to seat 102 from aisle 103. Particularly, the curves and angles of fixed furniture 108a in relation to seat pan front edges 136, 138 define both minimum spacing 316 and the ingress/egress path 406 to seat 102. Then, the legroom for each seat is determined by both the distance between seat pairs 100, 100a, and by position of the seat pan front edges in relation to the fixed furniture in front of it.

In that regard, front seat pan edge 136 is at an angle 302 past perpendicular to axis 300. Backrest 118 is parallel to seat pan edge 136, placing the overall seating angle of seat 102 at angle 302 past perpendicular to axis 300. Applying the rotation of angle 302 to those elements of seat 102 provides additional room for fixed furniture 106 to curve forward and away from seat 104. For example, if fixed furniture 106 were perpendicular to axis 300, and then curved forward only after clearing backrest 118, fixed furniture 106 would intrude further into after shoulder space 150 and reduce the space dedicated to seat 104 above armrest 128. In addition, FIG. 3 illustrates that headrest 110 is at an angle 306 past perpendicular to axis 300, with headrest wedge/guide 114 between headrest 110 and fixed furniture 106. Though headrest 110 is shown to curve to eventually follow the contour of fixed furniture 106, initially the angle of headrest 110 is determined by wedge/guide 114 and, preferentially for passenger comfort, in at least the section in front of wedge/guide 114 headrest 110 is parallel to pan front edge 136. Behind wedge/guide 114 and headrest 110, fixed furniture 106 is at an angle 310 (or 310a) past perpendicular to axis 300. Angle 310 will be greater than angle 306 due to the addition of wedge/guide 114.

Similarly, front seat pan edge 138 is at an angle 304 past perpendicular to axis 300. Backrest 120 is parallel to seat pan edge 138, placing the overall seating angle of seat 104 at angle 304 past perpendicular to axis 300. Applying the rotation of angle 304 to those elements of seat 104 provides additional room for fixed furniture 108 to curve forward and away from the seat behind it, as illustrated by fixed furniture 108a curving away from both seat pan edge 138 and seat pan edge 136. For example, if fixed furniture 108a were perpendicular to axis 300, and then curved forward only after clearing backrest 120a, fixed furniture 108a would significantly diminish minimum spacing 316 and the ingress/egress path to seat 102 from aisle 103. In addition, FIG. 3 illustrates that headrest 112 is at an angle 308 past perpendicular to axis 300, with headrest wedge/guide 116 between headrest 112 and fixed furniture 108. Though headrest 112 is shown to curve to eventually follow the contour of fixed furniture 108, initially the angle of headrest 112 is determined by wedge/guide 116 and, preferentially for passenger comfort, in at least the section in front of wedge/guide 116 headrest 112 is parallel to pan front edge 138. Behind wedge/guide 116 and headrest 112, fixed furniture 108 is at an angle 312 (or 312a) past perpendicular to axis 300. Angle 312 will be greater than angle 308 due to the addition of wedge/guide 116. In the embodiment of FIG. 3, angles 302, 304, 306, and 308 are the same. In an embodiment, this angle may be ten degrees. However, in other embodiments angles 302, 304, 306, and 308 may be different and other than ten degrees, depending on variables such as the amount of stagger, the desired seating angle, the desired minimum spacing, and the desired leg room. In the embodiment, of FIG. 3, angles 310 and 312 are the same. In an embodiment, this angle may be fifteen degrees. However, in other embodiments angles 310 and 312 may be different and other than fifteen degrees, depending on variables such as the amount of stagger, the desired seating angle, the desired minimum spacing, and the desired leg room. In the embodiment of FIG. 3, stagger 314 is approximately twelve inches. However, in other embodiments stagger 314 may be different depending on variables such as the desired seating angle, the fixed furniture angles, the desired minimum spacing, and the desired leg room. Furthermore, angles 312a and 304 may be increased to allow for increased stagger, with the stagger, angles 304 and 312a and minimum spacing 316 cooperating to provide an ingress/egress path to seat 102 (406, FIG. 4). It should be noted that minimum spacing 316 may not be in the plane of the floor of the compartment. Rather, it may be at an angle with respect to the floor of the compartment. This is illustrated further in FIG. 11. Additionally, in FIG. 3, it should be noted that minimum spacing 316 is not necessarily a function of the position of seat edge 136 and fixed furniture 108a. For example, armrest 126 could be dimensioned to extend further, such that armrest 126, rather than seat edge 136 defined minimum distance 316. In an embodiment, minimum spacing 316 is ten inches. It has been found that a minimum spacing of ten inches may result in the seating assembly meeting the current "after crash" minimum spacing of six inches. In an embodiment, the spacing between one row and the same point on a row immediately in front may be between thirty-eight and forty-two inches.

Figure 4:
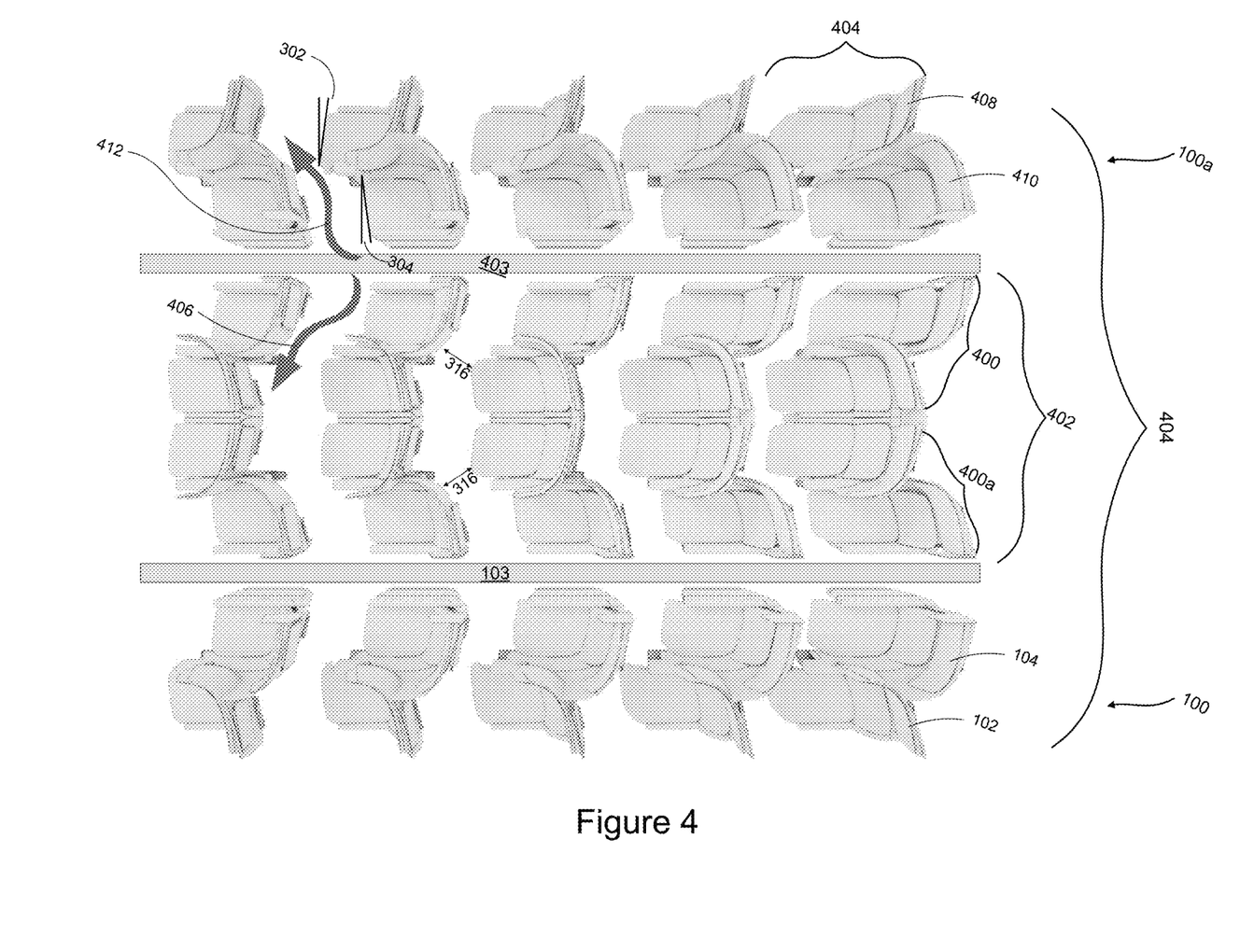
FIG. 4 is a top perspective view of embodiments of seating assemblies.
Figure 8:
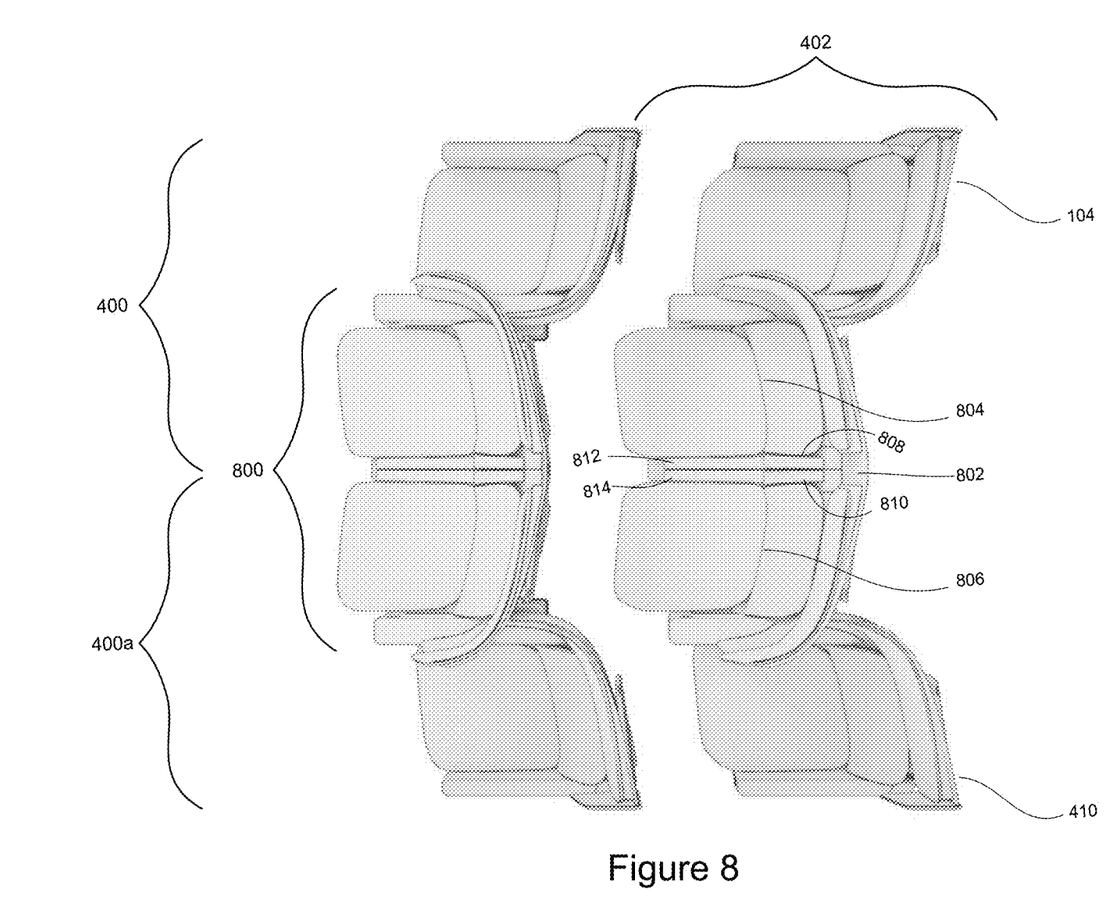
FIG. 8 is a top perspective view of an embodiment of a seating assembly.

FIG. 4 is a top perspective view of embodiments of seating assemblies providing a two-four-two seating configuration, with the middle two seats providing a large double seat that may be converted to two individual seats (the convertible double seat is discussed further with respect to FIG. 8). In FIG. 4, a row of seat pairs 100, described with respect to FIGS. 1-3, is shown below aisle 103. Seat pair 100a is a mirror-image of seat pair 100 and includes seats 408 and 410, with seat 408 being a mirror-image of seat 102, and seat 410 a mirror-image of seat 104. A row of seat pairs 100a are shown above aisle 403. Seat pair 100 may be modified slightly to become seat pair 400. Similarly, seat pair 100a may be modified to become seat pair 400a. Seat pairs 400 and 400a may be joined to form a quad seating section 402. In creating quad seating section 402, the primary modification is that the fixed furniture of seats 102 and 408 have been joined. Otherwise, the dimensions in quad seating section 402 of, e.g., the stagger, fore/aft separation, seat angles, seat pans, backrests, fixed furniture, and added shoulder spaces are the same as the corresponding dimensions of seat pair 100. For this reason, minimum separation 316 also applies to quad seating section 402. Due to the symmetry, an ingress/egress pathway 406 that provides access to the center seat of quad seating section 402 from aisle 403 is the mirror-image of an ingress/egress pathway 412 that provides access to the window seat 408 of seat pair 100a. In an embodiment, a row of seating assemblies 404 includes a first seat pair 100, an aisle 103, a quad seating section 401, an aisle 403, and a second seat pair 100a.

Figure 5:
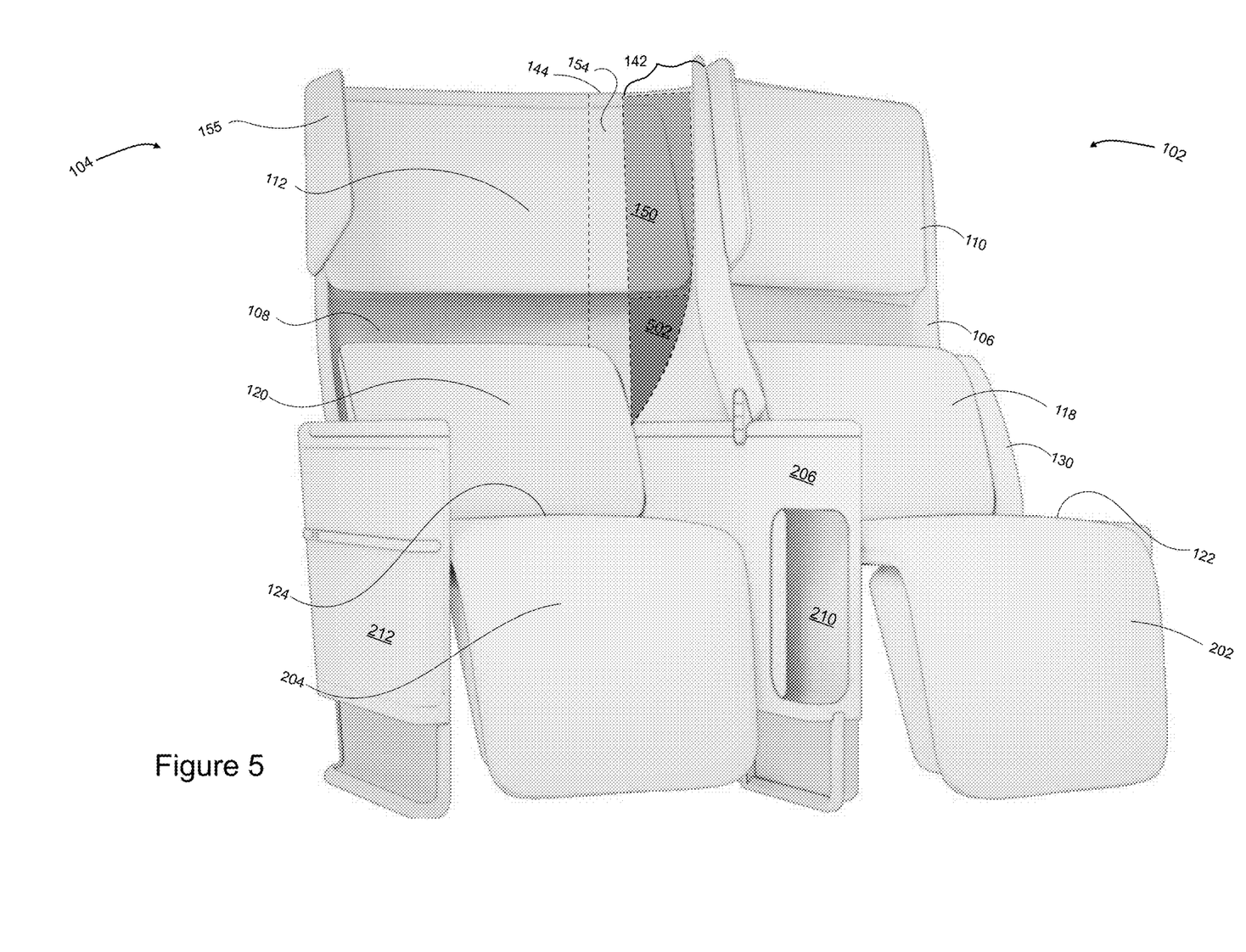
FIG. 5 is a side perspective view of the embodiment of FIG. 1.

FIG. 5 is a side perspective view of the embodiment of FIG. 1. FIG. 5, further illustrates how added aft shoulder space 150 is created by aft privacy furniture section 142 (much like aft should space 148 and furniture section 140). An aft shoulder area outward ramp area 502 results from fixed furniture 108 extending outward from armrest 128 (and behind fixed furniture 106) as fixed furniture 108 rises above armrest 128. In an embodiment, privacy furniture section 142 may extend around armrest 128 and up from armrest 128 to an extend that results in armrest 128 being dedicated to seat 104, but that does not visually isolate seat 104 from the seat that is behind seat 104. For example, privacy section 142 may extend six or even fewer inches above armrest 128 and still effectively dedicate armrest 128 to set 104. In an embodiment, seat 104 does not include privacy section 142, since privacy section 140 effectively eliminates any competition for armrest 128 and creates a privacy screen between seats 102 and 104. In an embodiment, because seat 104, being aft of seat 102, will have armrest 128 dedicated as a result of forward privacy furniture section 140, seat 104 may not have privacy furniture section 142 and still receive the benefits of a dedicated armrest and aft shoulder space 150.

Figure 6:
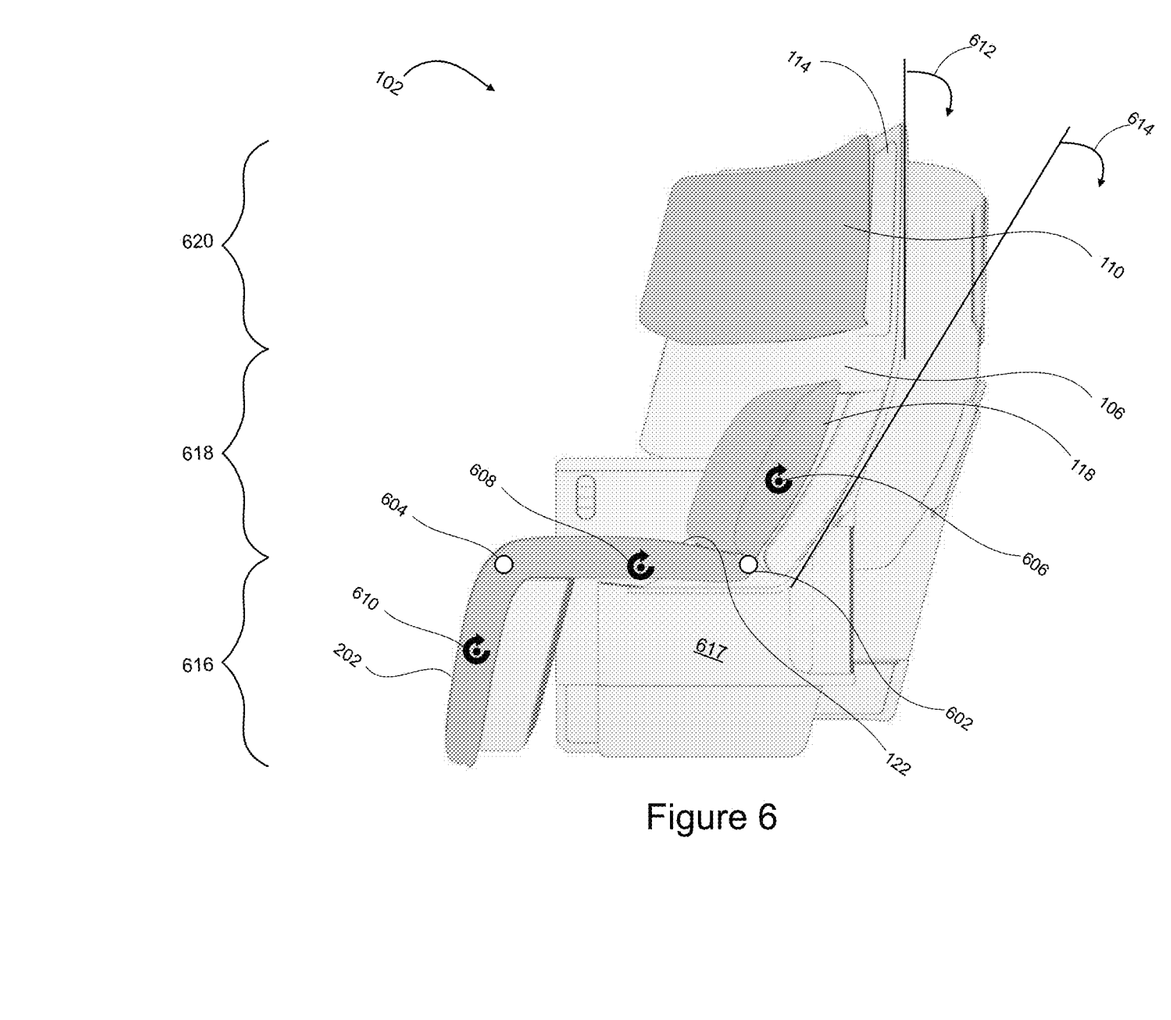
FIG. 6 is a side view of the embodiment of FIG. 1.
Figure 7:
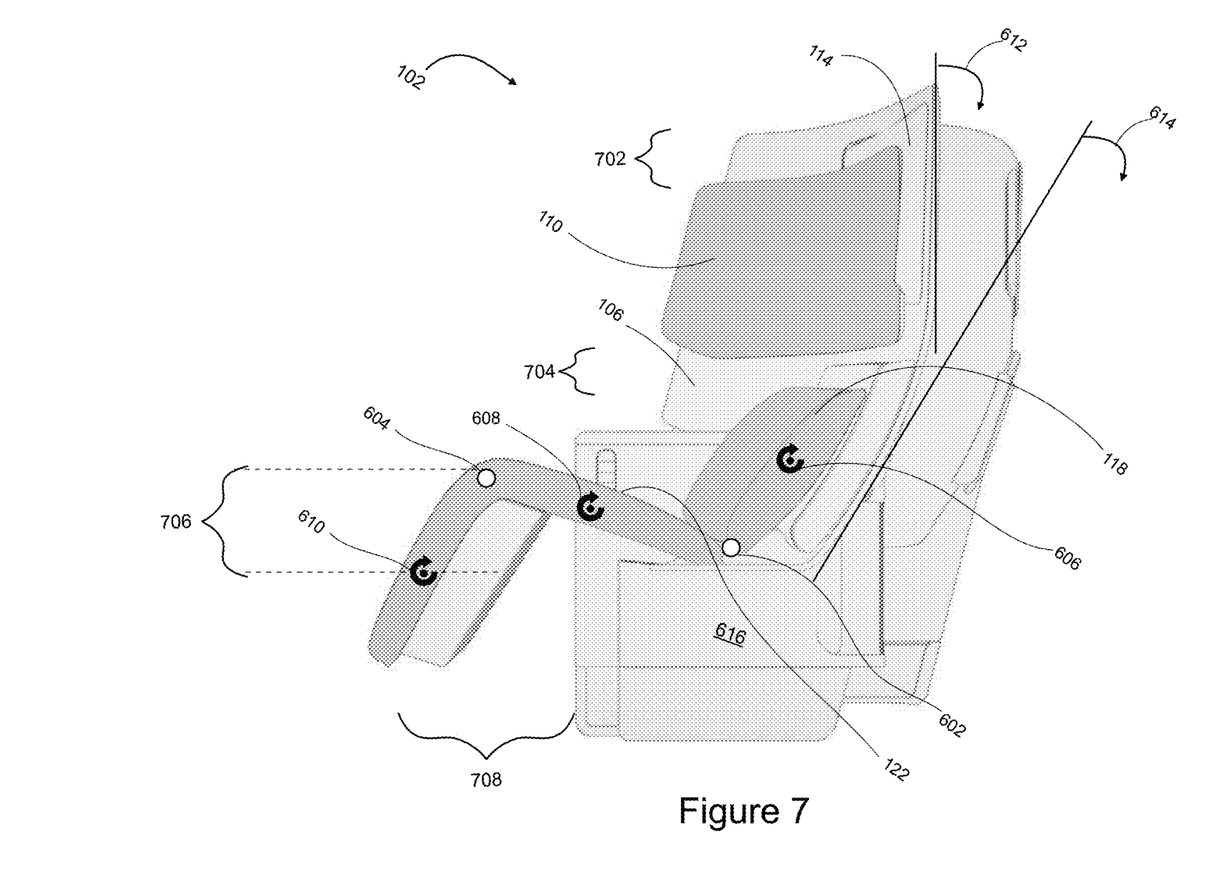
FIG. 7 is a side view of the embodiment of FIG. 1.

FIG. 6 and FIG. 7 are side views of the embodiment of FIG. 1. FIG. 6 and FIG. 7 further illustrates aspects of headrest 110, backrest 118, seat pan 122 and leg rest 202 moving independently from fixed furniture 106, with FIG. 6 illustrating an upright position and FIG. 7 illustrating a reclined position. In FIG. 6, headrest 110, backrest 118, seat pan 122, and leg rest 202 may move (e.g., slide or rotate or both) with respect to fixed furniture 106. Backrest 118 may rotate with respect to an axis 606. Seat pan 122 may rotate with respect to axis 608 and leg rest 202 may rotate with respect to axis 610. While backrest 118, seat pan 122, and leg rest 202 are shown joined at linkages 602 and 604, in an embodiment these elements may be independent of each other depending on the level of complexity desired.

FIG. 6 illustrates further aspects of fixed furniture 106. Fixed furniture 106 may be considered to have a seat pan section 616, a backrest section 618, and a headrest section 620. Within seat pan section 616 a footwell 617 may be formed that is for the use of a passenger behind seat 102. In the embodiment, headrest 110, backrest 118, seat pan 122, and leg rest 220 do not move into any region aft of fixed furniture 106. Thus, the passenger behind seat 102 may enjoy their dedicated space without the threat of any section of it being lost due to ingress from any part of seat 102. Aspects of that dedicated space are further illustrated by an angle 614 that is tangent to a part of backrest section 618 and an angle 612 that is tangent to a part of headrest section 620.

Angles 612 and 614 illustrate that fixed furniture 106 curves or angles forward as it approaches footwell 617, creating more knee space for the passenger behind seat 102. In embodiments, the curvature of fixed furniture section 618 and the resulting tangent(s) may be manipulated to affect minimum spacing 316 (See, e.g., FIG. 11).

In FIG. 7, seat 102 is shown reclined. Headrest 110 has been lowered an amount 702. Backrest 118 has been lowered an amount 704 and rotated about axis 606, which advanced joint 602. Seat pan 122 has been moved forward and down and rotated about axis 608, resulting in the lifting of joint 604 and the lifting of leg rest 202 and the rotation of leg rest 202 about axis 610. As a result of this movement, leg rest 202 has advanced distance 708 and risen a distance 706. Note that none of the changes between the upright and reclined positions negatively affect any space aft of fixed furniture 108 or within footwell 617. In the embodiment, the various seat sections may be stopped by the passenger at arbitrary positions between fully upright and fully reclined. In the embodiment, the rotations of angles 606, 608, 610 may be different, such that the relative angles between the seat sections may be changed. In the embodiment, headrest 110 moves independently from backrest 118, but in another embodiment the movement of the two may be linked. In an embodiment, backrest 118 may be at an angle of eight degrees in the upright position and recline a further fifteen degrees.

FIG. 8 is a top perspective view of embodiments of seating assemblies 400, 400a, 402, and 800. In FIG. 8, seat pair 400 and seat pair 400a are joined together with the innermost seats forming a seat pair 800. In the embodiment, seat pair 800 has a single fixed furniture 802. But in other embodiments fixed furniture 802 may have separate sections for each seat. The dimensions of fixed furniture 802, aft of seat 804 mimic the dimensions of fixed furniture 106 aft of seat 104. The dimensions of fixed furniture 802 aft of seat 806 are the mirror image. As shown, seat pair 800 lacks privacy features separating forward seat 804 from forward seat 806. Seat pair 800 does include privacy features separating forward seat 804 from aft seat 104, and separating forward seat 806 from aft seat 410. In this configuration, seat pair 800 is considerably private and separated from the remainder of the compartment. Thus, seat pair 800 may be reserved by or for people who are travelling together, or for single people who need two seats. Further aspects of seat pair 800 include moveable armrests 808, 810, shown in the stowed position, which provides additional seat pan areas 812, 814.

Figure 9:
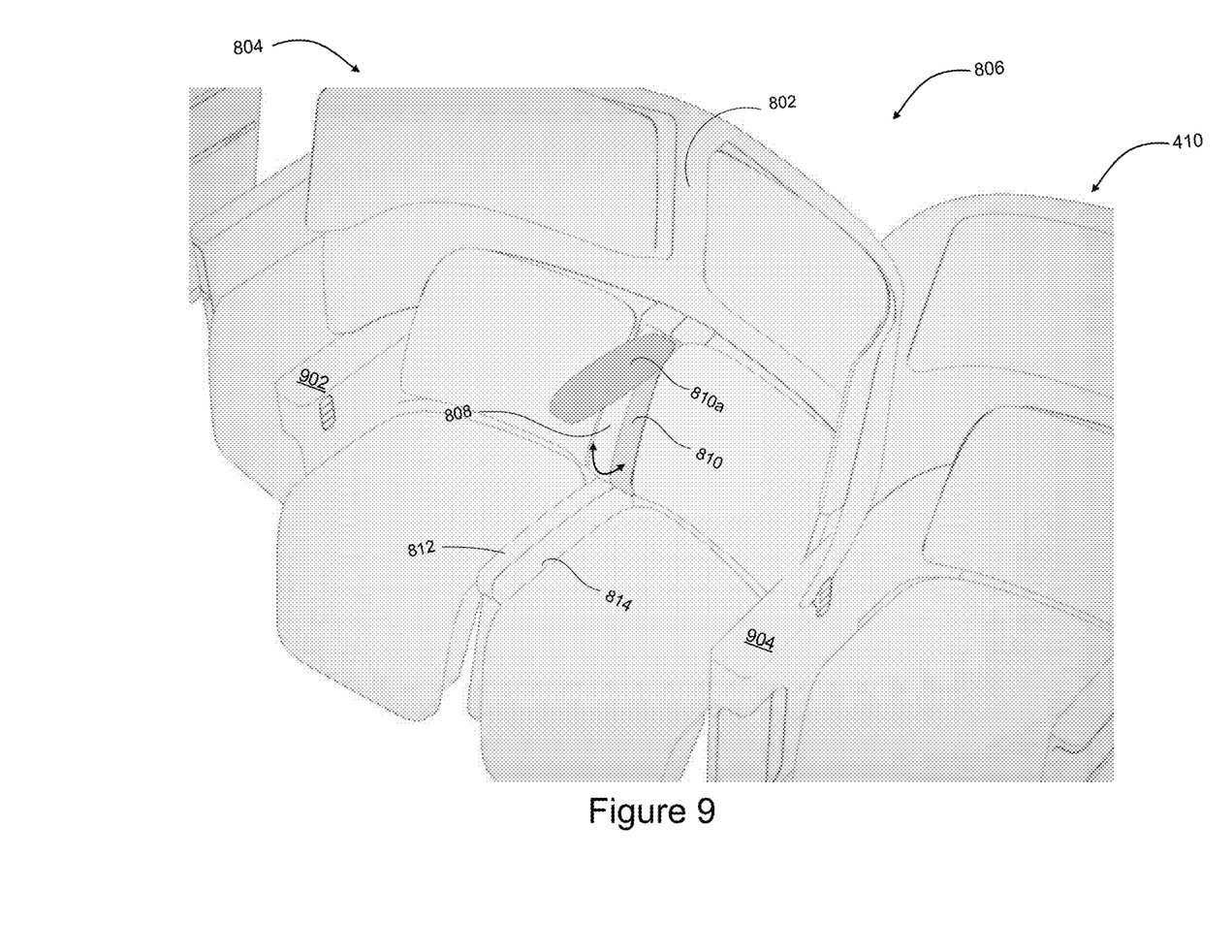
FIG. 9 is a top perspective view of the embodiment of FIG. 8.

FIG. 9 is a top perspective view of the embodiment of FIG. 8. FIG. 9 further illustrates that seats 804 and 806 retain the previously discussed privacy features with respect to the "outboard" seat, which for seat 806 is seat 410. For example, armrests 902 and 904 are dedicated to seats 804 and 806 respectively. Seats 804, 806 also retain the added shoulder space (though not numbered in FIG. 9). Armrest 810 may rotate from the stowed position to a horizontal position 810a and adjusted to a desired height. Armrest 808 may be similarly moved.

Figure 10:
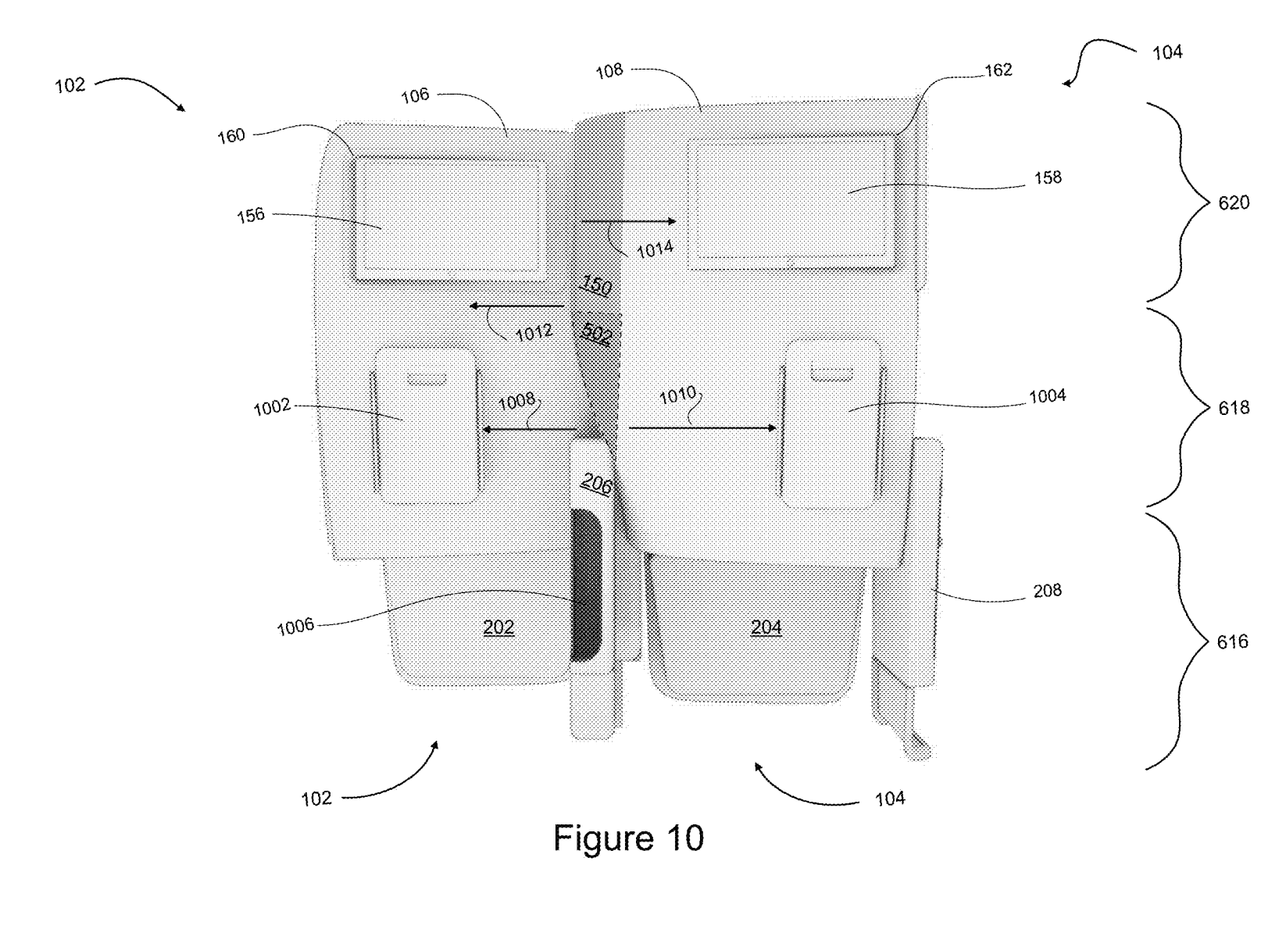
FIG. 10 is a rear view of the embodiment of FIG. 1.

FIG. 10 is a rear view of the embodiment of FIG. 1. In FIG. 10, seats 102, 104 are shown to include tray tables 1002, 1004 and, in console 206, a console storage 1006. Added aft shoulder space 150 and aft should space outward ramp 502 are indicated from behind to show the increased space provide by fixed furniture 108. Due to the angling and curvature of fixed furniture 106, 108, monitors 156, 158 may be attached at one end 160, 162, and offset 1012, 1014 from center. The attachments at ends 160, 162 may allow monitors 156, 158 to be angled with respect to fixed furniture 106, 108 for better viewing. Due to the angling and curvature of fixed furniture 106, 108, tray tables 1002, 1004 may be similarly offset 1008, 1010. Console storage 1006, as shown is positioned for use by the passenger behind seat 102, who, due to the stagger, is nearest.

Figure 11:
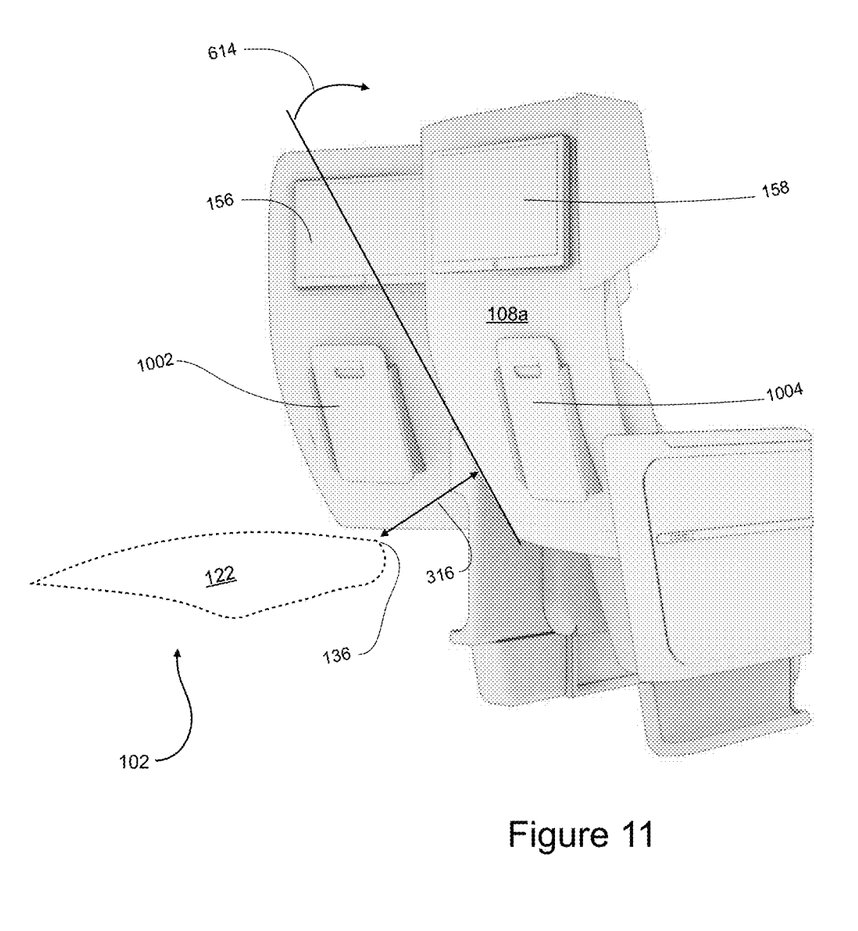
FIG. 11 is a rear perspective view of the embodiment of FIG. 1.

FIG. 11 is a rear perspective view of the embodiment of FIG. 1. FIG. 11 shows further aspects of minimum spacing 316. It may be beneficial to review FIG. 11 with occasional reference to FIG. 3. In FIG. 11, minimum spacing 316 is shown to be measured as the minimum distance between seat edge 136 of seat 102 and a section of fixed furniture 108a. It should be noted that seat 102 is not the seat that is directly behind fixed furniture 108a. Thus, FIG. 11 further illustrates that the minimum spacing is not found between one seat and the seat directly in front of it. In other words, the minimum spacing between seats does not also define knee room. As discussed with respect to FIG. 6, minimum distance 316 may be manipulated by changing angle 614 that is tangent to a part of fixed furniture 108a and the associated curves (with respect to both horizontal and vertical axes) of fixed furniture 108a.

Figure 12:
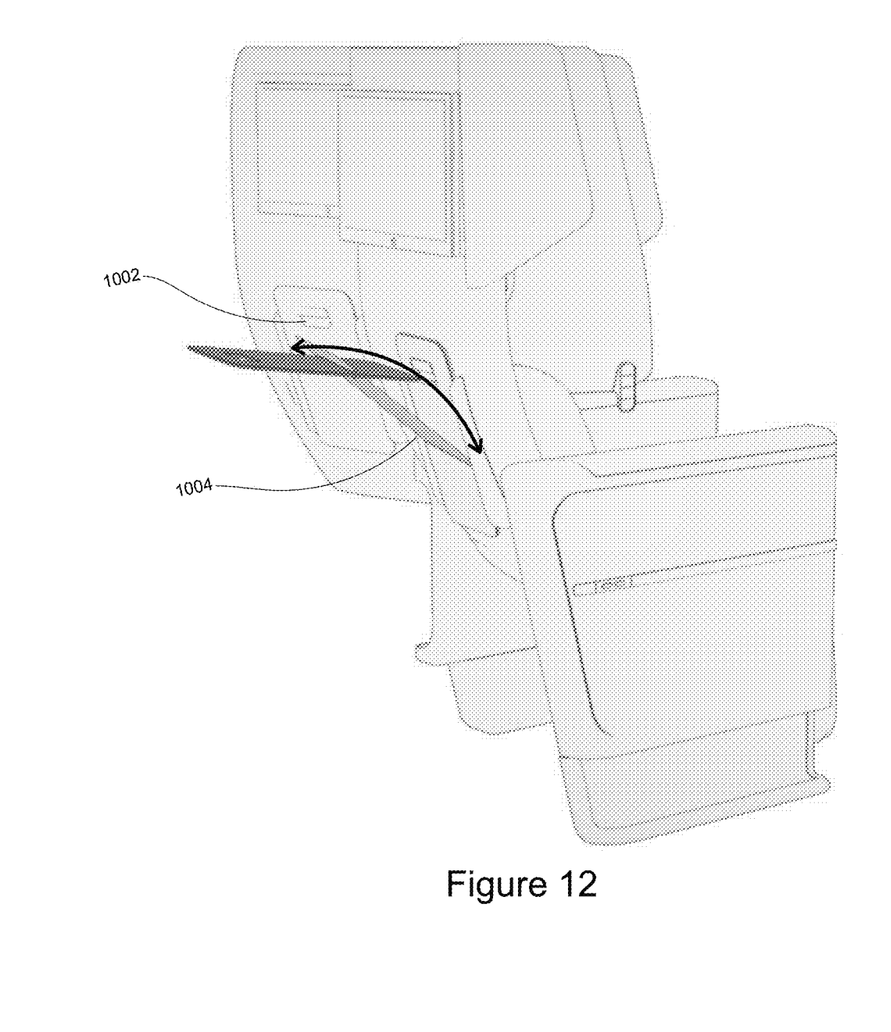
FIG. 12 is a rear perspective view of the embodiment of FIG. 1.

FIG. 12 is a rear perspective view of the embodiment of FIG. 1. In an embodiment, tray tables 1002, 1004 may be deployed by being translated up and then rotated to be flat. In an embodiment, once it is deployed and flat, the tray tables may be unfolded to provide twice the surface area.

Figure 13:
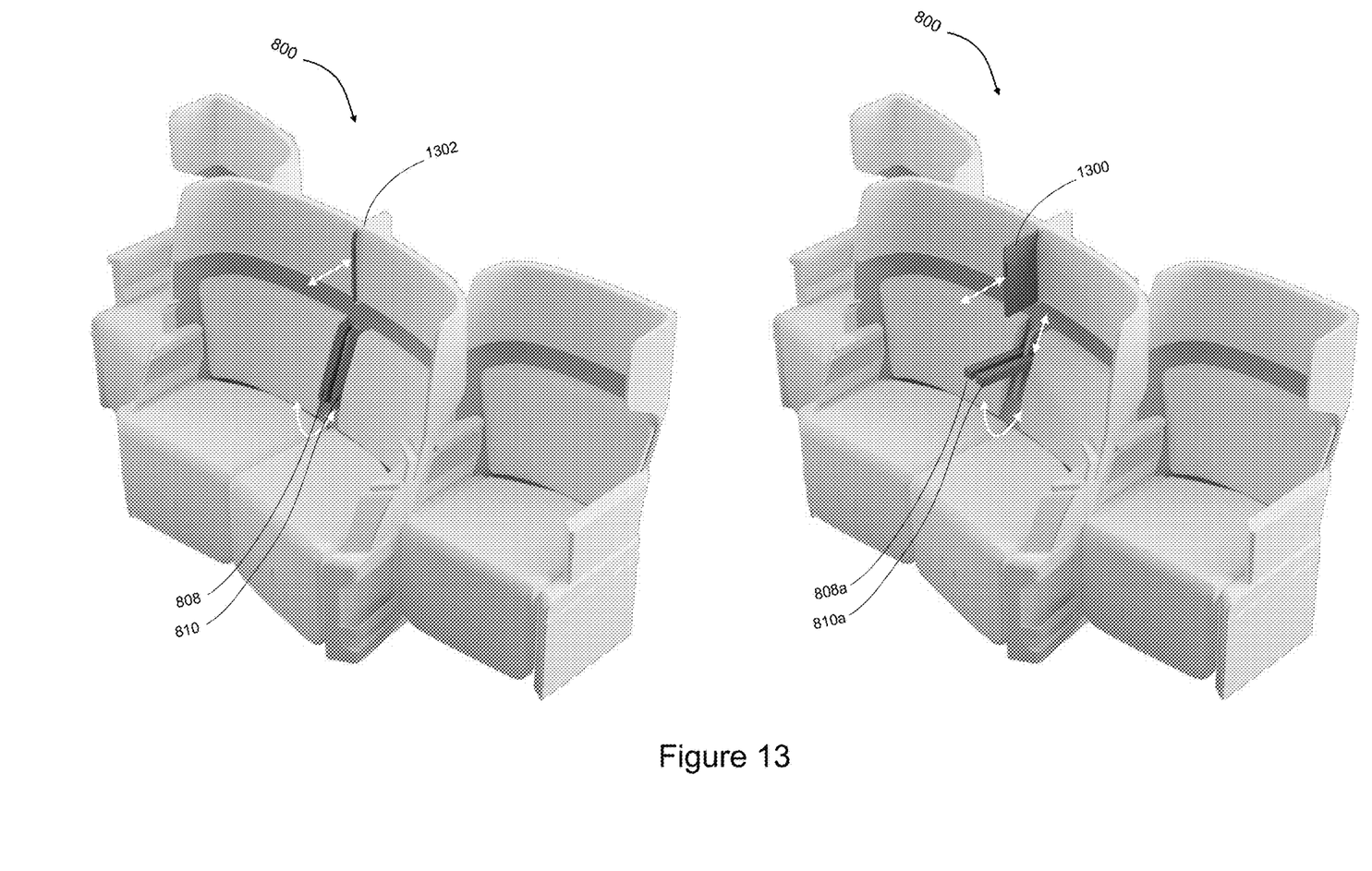
FIG. 13 is a perspective view of the embodiment of FIG. 8.

FIG. 13 is a perspective view of seat pair 800. In FIG. 13, to provide the option of privacy between passengers, a partition 1300 may be fixed within a slot 1302 and the armrests moved to positions 808a, 810a. Thus, seat pair 800 may be transformed from one large double seat to two individual seats.

In the description above and throughout, numerous specific details are set forth in order to provide a thorough understanding of an embodiment of this disclosure. It will be evident, however, to one of ordinary skill in the art, that an embodiment may be practiced without these specific details. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure. In other instances, well-known structures and devices are shown in simplified form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

We claim:

1. A pair of seats comprising:
a first seat connected to a second seat, the pair of seats being a first pair of seats and at least part of a first row of seats;
the first seat including a first shell with a first curved section extending toward the second seat and the first seat further including, supported by the first shell, a first headrest, a first backrest, a first seat pan with a first seat pan edge, and first and second armrests; and
the second seat, the second seat including a second shell with a second curved section extending toward the first seat and the second seat further including, supported by the second shell, a second headrest, a second backrest, a second seat pan with a second seat pan edge, and third and fourth armrests, wherein:
the second and third armrests are inner armrests with respect to the first and second seat pans, the first and fourth armrests are outer armrests, and the armrests are oriented in a first direction defining a front direction;
the first shell is positioned forward in the first direction from the second shell;
the first shell is positioned in a second direction transverse from the first direction, such that at least part of the second armrest is positioned directly in front of the third armrest;
the second seat pan edge and the second backrest are at a first angle past perpendicular from the first direction; and
when a second pair of seats, with a third seat identical to the first seat and a fourth seat identical to the second seat such that the second pair of seats is identical to the first pair of seats, is positioned a second distance immediately behind the first pair of seats, the first angle, a curve of the second curved section, and the second distance cooperate to provide an access path between the second and fourth seats to the third seat, the access path having a minimum spacing between the second shell and the third seat pan.

2. The pair of seats of claim 1, wherein the second shell behind the second backrest is curved such that a tangent to the second shell creates a second angle, measured from vertical, the second angle increasing as the second shell curves from a backrest top to a backrest bottom.

3. The pair of seats of claim 1, wherein the first curved section extends from behind the first backrest and along the first armrest, hindering access to an area of the first armrest from the second seat, and the second curved section extends from behind the second backrest and along the second armrest to the first shell.

4. The pair of seats of claim 3, wherein the first curved section extends from the first armrest up to a height of a top of the first headrest and the second curved section extends from the second armrest up to the height of the top of the first headrest.

5. The pair of seats of claim 4, wherein the first curved section extends further in the second direction as the height of the first curved section from the first armrest increases, defining a first shoulder space and the second curved section extends further from the second armrest as the height of the second curved section from the second armrest increases, defining a second shoulder space beyond the second armrest.

6. The pair of seats of claim 1, wherein the first headrest, the first backrest, and the first pan may be reclined with respect to the first shell without the first shell moving, and without the first headrest, the first backrest, or the first pan extending into a first space behind the first shell, or extending into a foot space below the first shell, the first space and the foot space defined by the position of the first shell, and wherein the second headrest, the second backrest, and the second pan may be reclined with respect to the second shell without the second shell moving, and without the second headrest, the second backrest, or the second pan extending into a second space behind the second shell, or extending into a foot space below the second shell, the second space and the foot space defined by the position of the second shell.

7. A pair of seats comprising:
a first seat connected to a second seat, the pair of seats being a first pair of seats and at least part of a first row of seats;
the first seat including a first shell with a first curved section extending toward the second seat, the first seat further including, supported by the first shell, a first headrest, a first backrest, a first seat pan with a first seat pan edge, and first and second armrests; and
the second seat, the second seat including a second shell with a second curved section extending toward the first seat, the second seat further including, supported by the second shell, a second headrest, a second backrest, a second seat pan with a second seat pan edge, and third and fourth armrests, wherein:
the second and third armrests are inner armrests with respect to the first and second seat pans, the first and fourth armrests are outer armrests, and the armrests are oriented in a first direction defining a front direction;
the first shell is positioned forward in the first direction a first distance from the second shell;
the second seat pan edge and the second backrest are at a first angle past perpendicular from the first direction; and
when a second pair of seats, with a third seat identical to the first seat and a fourth seat identical to the second seat such that the second pair of seats is identical to the first pair of seats, is positioned a second distance immediately behind the first pair of seats, the first angle, a curve of the second curved section, and the second distance cooperate to provide an access path between the second and fourth seats to the third seat, the access path having a minimum spacing between the second shell and the third seat pan.

8. The pair of seats of claim 7, wherein the second shell behind the second backrest is curved such that a tangent to the second shell creates a second angle, measured from vertical, the second angle increasing as the second shell curves from a backrest top to a backrest bottom.

9. The pair of seats of claim 7, wherein the first shell is positioned forward in the first direction from the second shell; and
the first shell is positioned in a second direction transverse from the first direction such that at least part of the first armrest is positioned directly in front of the second armrest.

10. The pair of seats of claim 9, wherein the first curved section extends from behind the first backrest and along the first armrest, hindering access from the second seat to an area of the first armrest, and the second curved section extends from behind the second backrest and along the second armrest to the first shell.

11. The pair of seats of claim 10, wherein the first curved section extends from the first armrest up to a height of a top of the first headrest and the second curved section extends from the second armrest up to the height of the top of the first headrest.

12. The pair of seats of claim 11, wherein the first curved section extends further in the second direction as the height of the first curved section from the first armrest increases, defining a first shoulder space and the second curved section extends further from the second armrest as the height of the second curved section from the second armrest increases, defining a second shoulder space.

13. The pair of seats of claim 7, wherein the first headrest, the first backrest, and the first pan may be reclined with respect to the first shell without the first shell moving, and without the first headrest, the first backrest, or the first pan extending behind the first shell, or extending into a first foot space below the first shell, and wherein the second headrest, the second backrest, and the second pan may be reclined with respect to the second shell without the second shell moving, and without the second headrest, the second backrest, or the second pan extending behind the second shell, or extending into a second foot space below the second shell.

* * * * *